(12) United States Patent
Van Druten et al.

(10) Patent No.: US 7,824,294 B2
(45) Date of Patent: Nov. 2, 2010

(54) TRANSMISSION SYSTEM, IN PARTICULAR FOR A MOTOR VEHICLE

(75) Inventors: Roëll Marie Van Druten, Eindhoven (NL); Bas Gerard Vroemen, Eindhoven (NL); Alexander Franciscus Anita Serrarens, Waedre (NL)

(73) Assignee: DTI Group B.V., Eindhoven (NL)

( * ) Notice: Subject to any disclaimer, the term of this patent is extended or adjusted under 35 U.S.C. 154(b) by 718 days.

(21) Appl. No.: 10/556,158

(22) PCT Filed: May 10, 2004

(86) PCT No.: PCT/NL2004/000314

§ 371 (c)(1),
(2), (4) Date: Nov. 20, 2006

(87) PCT Pub. No.: WO2004/098937

PCT Pub. Date: Nov. 18, 2004

(65) Prior Publication Data

US 2007/0060432 A1    Mar. 15, 2007

(30) Foreign Application Priority Data

| May 8, 2003 | (NL) | .................................... 1023366 |
| May 8, 2003 | (NL) | .................................... 1023367 |
| Jun. 26, 2003 | (NL) | .................................... 1023754 |
| Jul. 11, 2003 | (NL) | .................................... 1023887 |
| Jan. 6, 2004 | (NL) | .................................... 1025170 |

(51) Int. Cl.
*F16H 37/02* (2006.01)

(52) U.S. Cl. ...................................... 475/207; 475/209

(58) Field of Classification Search ................. 475/207, 475/209

See application file for complete search history.

(56) References Cited

U.S. PATENT DOCUMENTS 3,673,890 A * 7/1972 Crooks ....................... 475/207

(Continued)

FOREIGN PATENT DOCUMENTS

DE    197 41 440 A1    4/1999

(Continued)

OTHER PUBLICATIONS

European Patent Search Report dated Jul. 16, 2008 for EP Patent Appln. No. 08101074.6 (3 pages).

*Primary Examiner*—Ha D. Ho
(74) *Attorney, Agent, or Firm*—Vista IP Law Group LLP

(57) ABSTRACT

A vehicle comprises a drive source that drives the wheels via a transmission system. The transmission system has an epicyclic gearing with three rotational members a first rotational member connected to the drive source, a second rotational member connected to the wheels via a first reduction and a final reduction and a third rotational member connected to a brake. The brake constitutes reaction means for balancing torque. The transmission system also includes a transmission parallel to the epicyclic gearing and a transmission in series with the epicyclic gearing. Moreover, the transmission system has a lock-up clutch capable of connecting the first rotational member to the second rotational member. This transmission system enables shifting between various transmission ratios without torque interruption, using only one brake. The transmission in series with the epicyclic gearing can directly be connected to the load via the lock-up clutch or via the 'braked' planetary set.

20 Claims, 8 Drawing Sheets

U.S. PATENT DOCUMENTS

| | | | |
|---|---|---|---|
| 4,233,858 A | | 11/1980 | Rowlett |
| 4,404,869 A | * | 9/1983 | Numazawa et al. ......... 475/207 |
| 4,525,661 A | | 6/1985 | Mucsy et al. |
| 4,924,729 A | * | 5/1990 | Sherman et al. ............. 475/207 |
| 5,471,892 A | * | 12/1995 | Sherman ...................... 74/325 |
| 5,730,675 A | | 3/1998 | Yamaguchi |
| 5,856,709 A | * | 1/1999 | Ibaraki et al. ................. 290/45 |
| 6,387,006 B1 | | 5/2002 | Jung |
| 6,502,652 B2 | * | 1/2003 | Rogg ...................... 180/65.21 |
| 6,524,217 B1 | | 2/2003 | Murakami et al. |
| 7,086,977 B2 | * | 8/2006 | Supina et al. .................. 475/5 |
| 7,175,555 B2 | * | 2/2007 | Kozarekar et al. ............. 475/5 |

FOREIGN PATENT DOCUMENTS

FR    2 824 509 A1    11/2002

* cited by examiner

TRANSMISSION SYSTEM, IN PARTICULAR FOR A MOTOR VEHICLE

This Application is a National Stage Filing under 35 U.S.C. §371. This Application claims priority under 35 U.S.C. §365 and any other applicable statutes, to International Application Serial No. PCT/NL2004/000314, filed on May 10, 2004, which itself claims priority to Dutch Application No. 1023366, filed on May 8, 2003, Dutch Application No.1023367, filed on May 8, 2003, Dutch Application No. 1023754, filed on Jun. 26, 2003, Dutch Application No. 1023887, filed on Jul. 11, 2003, and Dutch Application No. 1025170, filed on Jan. 6, 2004. The aforementioned Applications are incorporated by reference as if set forth fully herein.

FIELD OF THE INVENTION

The invention relates to a transmission system, in particular for a vehicle, comprising an input shaft, which is connectable to a drive source, and an output shaft, which is connectable to a load, in particular the driven wheels of a vehicle, which transmission system furthermore comprises reaction means for balancing torque and an epicyclic gearing with at least three rotational members, of which a first rotational member is connected to the input shaft via a first node, a second rotational member is connected to the output shaft via a second node, and a third rotational member is or can be connected to the reaction means via a third node, and which transmission system comprises at least one transmission that includes at least one synchromesh and/or dog clutch necessary for changing the transmission ratio, which transmission has an input and output shaft the transmission ratio of which can have at least two values, and which transmission is parallel with the epicyclic gearing, where the input and output shafts of the transmission are connected to two of the three nodes, or is in series with the epicyclic gearing, where the input and output shafts of the transmission are connected to one of the nodes on the one hand, and the rotational member or the reaction means connected to that node or input or output shaft of the transmission system, on the other, and which reaction means comprise a brake.

More particularly, the invention relates to transmission systems with a possibly (semi)automatic transmission consisting of an input and output shaft with gearwheel pairs that can transmit torque/power, where one gearwheel of each gearwheel pair can be connected to and disconnected from the shaft.

An epicyclic gearing can be a planetary gear set and a drive source can be a combustion engine, among others. A load can be the front- and/or rear wheels of a vehicle, but also a generator or auxiliary systems such as an air-conditioning system.

TECHNICAL STATE-OF-THE-ART

A similar transmission system is known from FR-A-2 824 509. In the known transmission system, the reaction means are constituted by an electric motor which also can act as an electrodynamical brake.

SUMMARY OF THE INVENTION

An objective of the invention is to further improve a transmission system as described in the introduction. To this end, the transmission system according to the invention is characterized in that the brake comprises a friction element which can dissipate substantial power.

This way an inexpensive and simple transmission system is obtained. By appropriately activating the brake, more or less torque can be balanced. When the brake is fully closed, the epicyclic gearing forms a fixed transmission ratio between the input and output shafts of the transmission. This way, the transmission does not have to possess this transmission ratio, and hence one transmission ratio can be omitted from the transmission.

Preferably, the brake comprises a friction element which can dissipate substantial power (i. e., sufficient for severely braking or halting the third rotational member).

In addition, the reaction means can comprise an inertia, such as a flywheel, and/or have inertia.

The brake may or may not possess an inertia of such magnitude that torque can be balanced temporarily.

Yet another embodiment of the transmission system according to the invention is characterized in that the reaction means comprise the first node, where the third node is connected to the first node otherwise than via the epicyclic gearing. Preferably, the input and output shafts of the transmission are connected to, respectively, the first rotational member and the input shaft of the transmission system, or to, respectively, the second rotational member and the output shaft of the transmission system, and the transmission system furthermore comprises a reduction, that is located between the third or first rotational member and the input shaft of the transmission system, as well as a reduction-clutch that is located between the third rotational member and the input shaft of the transmission system. This facilitates reverse driving via the epicyclic gearing, which removes the necessity for a reverse gear in the transmission, thus enabling a less complex transmission system. Through the presence of the reduction that reverses the direction of rotation, and as such realizes opposing rotational speeds of the third rotational member and the input shaft of the transmission system, the vehicle speed can be controlled with high accuracy by changing the transmission ratio. Also, by closing the reduction-clutch, in case it is a slip-clutch, reverse driving with this transmission system is possible without the need for a dedicated reverse gear.

Yet a further embodiment of the transmission system according to the invention is characterized in that the transmission system comprises an electric motor that is connected or connectable to a part of the transmission system, such as a node, the reaction means, the input or output shaft of the transmission system, one of the rotational members, or the transmission. The electric motor can, at least briefly, take over propelling the wheels from the drive source. This can be useful in certain situations, for instance when the drive source is temporarily disconnected, or to facilitate synchronization of the transmission. Using an electric motor in this configuration, it is furthermore possible to drive off forward and backwards, after which the desired gear can be activated synchronously. This enables omitting a launch clutch.

Preferably, the transmission system furthermore comprises a launch clutch, that can connect and disconnect the input and output shafts of the transmission system. A further embodiment of the transmission system according to the invention is characterized in that the transmission system comprises a lock-up clutch, that is located between two of the three rotational members, preferably between the first and second rotational member. This lock-up clutch can connect two of the three rotational members. Through a suitable choice of the transmission ratios of the gear stages in the transmission and of the epicyclic gearing, the number of gear stages in the transmission can thus be reduced. Preferably, the lock-up clutch is constituted by the launch clutch.

Yet another embodiment of the transmission system according to the invention is characterized in that the transmission system comprises a disengager for the transmission that is located in the transmission system such that it can disengage the transmission from the input shaft of the transmission system. Preferably, the disengager for the transmission is constituted by the launch clutch.

The disengager can preferably connect the transmission to the node connected to the input shaft of the transmission, or it can connect this node to the other node that is connected to the transmission, or it can connect this node to neither.

Yet a further embodiment of the transmission system according to the invention is characterized in that the transmission system comprises at least one switch-clutch that is located between the reaction means or the input or output shaft of the transmission system, on the one hand, and the rotational member connected to it and one of the other two rotational members, on the other hand, where the switch-clutch can connect either the reaction means or the input or output shaft of the transmission system to one of the two said rotational members. In case the switch-clutch in this embodiment is located between the input shaft of the transmission system on the one hand, and the first and third rotational member, on the other, the switch-clutch can connect the drive source to the first or to the third rotational member. By disconnecting the drive source from the first rotational member and connecting it to the third rotational member, the power is transmitted to the wheels both through the transmission that is parallel to the epicyclic gearing, and through the epicyclic gearing, thus via two branches. This enables omitting gear ratios from the transmission while retaining the same number of different gear ratios as without the possibility of switching the connection of the drive source to the epicyclic gearing. Further transmission ratios can be realized by disconnecting the driven wheels from the second rotational member and temporarily connecting them to the third rotational member. This is possible if in this embodiment the switch-clutch is located between the output shaft of the transmission system on the, one hand, and the second and third rotational member on the other, where the switch-clutch can connect the driven wheels to the second or to the third rotational member.

A further embodiment of the transmission system according to the invention is characterized in that the, transmission system comprises at least one pair of switch-clutches, where each switch-clutch is located between one of the rotational members on the one hand, and two elements from the group elements consisting of the reaction means and the input and output shaft of the transmission system, on the other hand, where each switch-clutch can connect the appropriate rotational member to either one of the elements from the group elements. Preferably, a switch-clutch is, positioned between the first rotational member on the one hand, and the brake and the input shaft of the transmission system on the other, and the other switch-clutch is located between the third rotational member on the one hand, and the brake and the input shaft of the transmission system on the other. This way, the connections of the brake and the input shaft of the transmission system to the epicyclic gearing can be interchanged, enabling more braked transmission ratios, thus reducing the required number of gear stages in the transmission.

To enable the application of an even simpler transmission, a further embodiment of the transmission system according to the invention is characterized in that the epicyclic gearing comprises a fourth rotational member that is connected or connectable to a part of the transmission system, for instance to the reaction means or to the input or output shaft of the transmission system or to a further brake or to one of the other rotational members or to one of the nodes, or where the already present brake can be connected to the third or fourth rotational member. This way, the epicyclic gearing enables the realization of several different gear ratios, which do not have to be present in the transmission.

Yet a further embodiment of the transmission system according to the invention is characterized in that, in case the reaction means comprise an inertia element, the transmission system comprises a disengager for the inertia element, which is present between the inertia element and the third rotational member. In case the reaction means also comprise a brake, the inertia element (preferably a flywheel) can be disconnected from the third rotational member if desirable. This can for instance be desirable when the brake is activated. In that case, the brake does not have to decelerate the flywheel in addition, but instead all braking energy can be usefully applied for torque balancing.

Preferably, the transmission system also has a further disengager for the inertia element, that is located between the inertia element and the first rotational member.

This way, when combined with the aforementioned disengager for the inertia element, the inertia element can be disconnected from the third rotational member and connected to another rotational member. In doing so, additional functionality is created. For instance, in case the reaction means comprise a brake, the energy of the flywheel can be usefully applied when activating the brake. It is also possible to speed up the flywheel and maintain its speed using the drive source, especially when the vehicle is at rest. By activating the brake the flywheel will decelerate and its energy can be used to accelerate the vehicle. If the transmission is located between the drive source and the first rotational member, the speed of the drive source can be controlled independently from the flywheel speed by shifting or disengaging the transmission.

If both aforementioned disengagers for the inertia element are closed, together they function as a so-called lock-up clutch for the epicyclic gearing.

For reducing oscillations the transmission system according to the invention preferably comprises at least one torsional spring, which is located between a node on the one hand, and the reaction means or the input or output shaft of the transmission system, or the transmission or the epicyclic gearing on the other. The inertia of the reaction means (if indeed present) in this case contributes to the damping of oscillations, which moreover enables reducing of the inertias (of drive source and reaction means).

Furthermore, the transmission system according to the invention comprises at least one reduction, which is located between two parts of the transmission system, for instance between a node on the one hand, and the reaction means or the input or output shaft of the transmission system or the transmission or the epicyclic gearing on the other, or between the transmission on the one hand, and the reaction means or the input or output shaft of the transmission system or the epicyclic gearing on the other, or between the reaction means and the input or output shaft of the transmission system. A reduction is to be interpreted here as a mechanical transmission stage.

If a reduction is located between the brake and the third rotational member, the brake load can be lowered because this way the rotational speed of the shaft at which the brake is acting can be reduced or increased such that the slip speed can be chosen optimally. Furthermore, the torque that is exerted on the shaft by the brake can be amplified towards the third rotational member, enabling a less forceful brake actuation.

If a reduction is located between the first rotational member and the first node and/or the second rotational member and the second node, the number of gear stages in the transmission can be reduced, without lowering the total amount of possible transmission ratios. By suitably choosing the transmission ratio of this reduction, two gear stages can be omitted from the transmission while retaining the same number of different transmission ratios as without this reduction.

Preferably, the transmission system furthermore comprises at least one disengager for the reduction, which is located between the reduction and one of the parts of the transmission system connected to the reduction.

Furthermore, the transmission system preferably comprises at least one further clutch that is located between two parts of the transmission system. The clutches in the transmission system according to the invention can for instance be friction clutches, synchromeshes, dog clutches, electromechanical clutches, powder clutches or torque converters.

The transmission can furthermore be equipped with less gear stages by dividing the input and/or output shaft of the transmission into two or more subshafts, which can be interconnected via one or more transmission clutches. This yields a so-called 'Windungsanordnung' where an additional transmission ratio can be created by using a series connection of a number of existing gear stages.

The invention also relates to an auxiliary transmission system for application in a transmission system of the aforementioned kind, where the transmission is parallel to the epicyclic gearing and a clutch is furthermore located between the transmission and the input shaft of the transmission system, and where the epicyclic gearing and the reaction means are part of the auxiliary transmission system, where the epicyclic gearing comprises three rotational members of which a third rotational member is connected to the reaction means, which reaction means comprise a brake.

An auxiliary transmission system is therefore defined as a system that can be connected to an existing transmission system, comprising a transmission and a clutch.

Regarding the auxiliary transmission system, the invention is characterized in that the brake comprises a friction element which can dissipate substantial power, and that the auxiliary transmission system furthermore comprises first connecting means which are connected to a first rotational member of the epicyclic gearing, for connecting the first rotational member to an input shaft of the transmission system or to the input shaft of the transmission, and second connecting means, which are connected to the second rotational member of the epicyclic gearing, for connecting the second rotational member to an output shaft of the transmission system or to an output shaft of the transmission.

The invention furthermore relates to a method for increasing the power that is transmitted from a drive source to a load, in particular the driven wheels of a vehicle, via a transmission system according to the invention with lock-up clutch and/or disengager for either transmission or electric motor. Regarding the method the invention is characterized in that the lock-up clutch and/or the disengager for either the transmission or the electric motor is opened when more power is demanded. By opening the lock-up clutch and/or the disengager for either the transmission or the electric motor, the power to the wheels is immediately increased.

BRIEF DESCRIPTION OF THE DRAWINGS

In the following, the invention is further elucidated by drawings depicting several examples of configurations of the transmission system according to the invention.

DETAILED DESCRIPTION OF THE DRAWINGS

Figure 1:
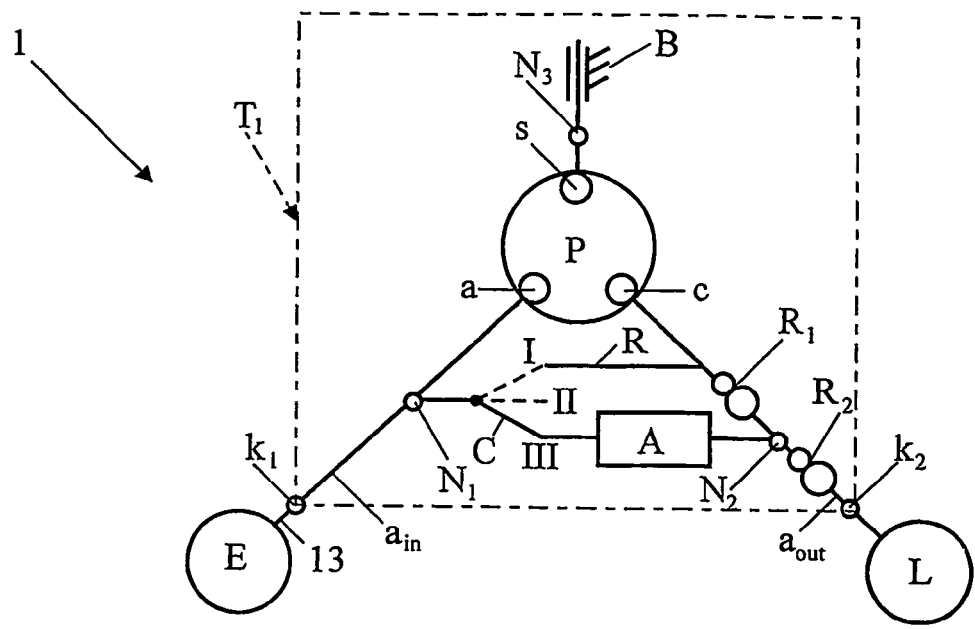
FIG. 1 depicts a diagram of a vehicle equipped with a first configuration of the transmission system according to the invention, where the transmission is parallel to the epicyclic gearing.
Figure 2:
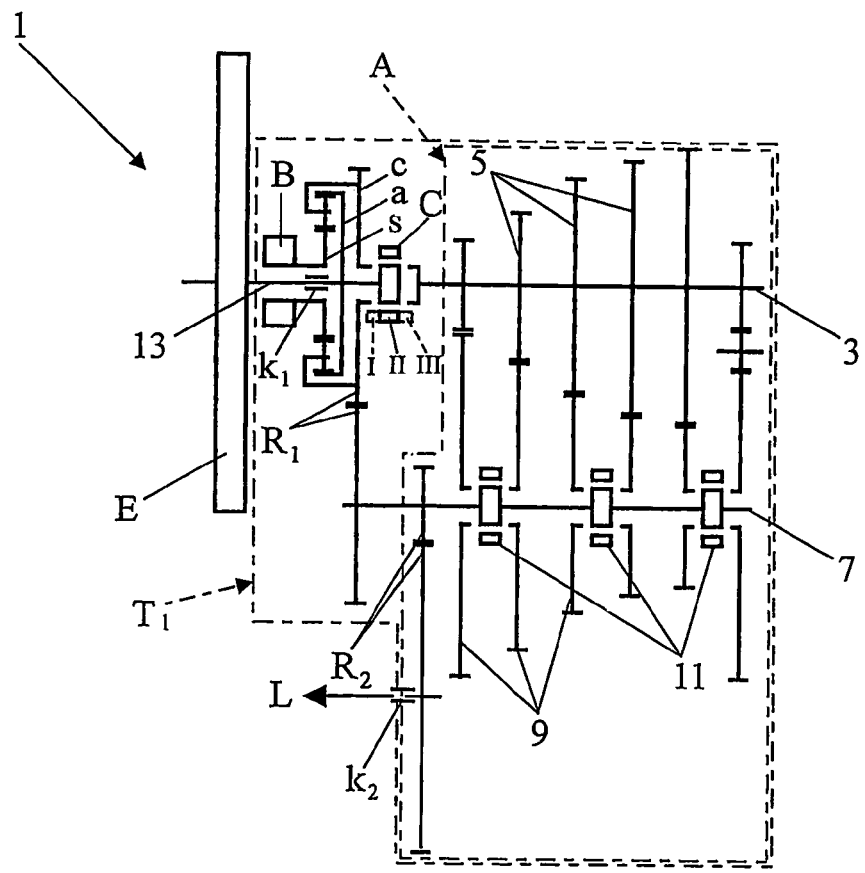
FIG. 2 schematically depicts a constructional configuration of the transmission system, of the vehicle that was depicted in FIG. 1.

FIGS. 1 and 2 depict a vehicle that is equipped with a first configuration. of the transmission system according to the invention, in a schematic and concrete form respectively. The vehicle 1 has a drive source E, formed by a combustion engine, that drives a load L, formed by the driven wheels of the vehicle, via a transmission system $T_1$. The transmission system $T_1$, has an input shaft $a_{in}$ that is connected to the drive source E via shaft-connection $k_1$, and an output shaft $a_{out}$ that is connected to the driven wheels L via shaft-connection $k_2$. The transmission system $T_1$, furthermore comprises an epicyclic gearing P, and parallel to the epicyclic gearing P, a transmission A that can be connected to the input shaft $a_{in}$ by a synhromesh C. The epicyclic gearing P is materialized as a planetary gear set comprising three rotational members s, a, c, of which a first rotational member a, formed by the ring gear, is connected to the input shaft $a_{in}$ via a first node $N_1$, a second rotational member c, formed by the planet carrier, is connected to the output shaft $a_{out}$, via a first reduction $R_1$, a second node $N_2$ and a final reduction $R_2$, where the output shaft itself is connected to the driven wheels L of a vehicle, and a third rotational member s, formed by the sun gear, that is connected to a brake B via a third node $N_3$. The brake B forms the reaction means for balancing torque.

The synchromesh C can connect the input shaft $a_{in}$ to the output shaft $a_{out}$, directly, position I, or via the transmission A, position III, or it can connect the input shaft $a_{in}$ to the output shaft $a_{out}$ neither directly nor via the transmission A, neutral position II, in which latter case the input shaft $a_{in}$ is connected to the output shaft $a_{out}$ via the epicyclic gearing P only.

The fixed gearwheels 5 are located on the input shaft 3 of the transmission A, and the free gearwheels 9 can be connected to the output shaft 7 via synchromeshes 11.

Launching the vehicle 1 that comprises this transmission system $T_1$, can be done by positioning the synchromesh C in its neutral position II, which is the position where the synchromesh C disconnects the output shaft 13 of the drive source E from the reduction R and the transmission A, and gradually closing the brake B. After that, upshifting can take place by selecting, for instance, the first gear of the transmission A, placing the synchromesh C in position III and releasing the brake B.

While driving, the drive source E can be decelerated by gradually closing the brake B, and accelerated by gradually releasing the brake B which was closed prior to that.

Next it is desirable that the speed difference of the shafts that are to be connected or disconnected, is as small as possible during the shift of the synchromesh C. This can be achieved by activating the brake appropriately.

Figure 3:
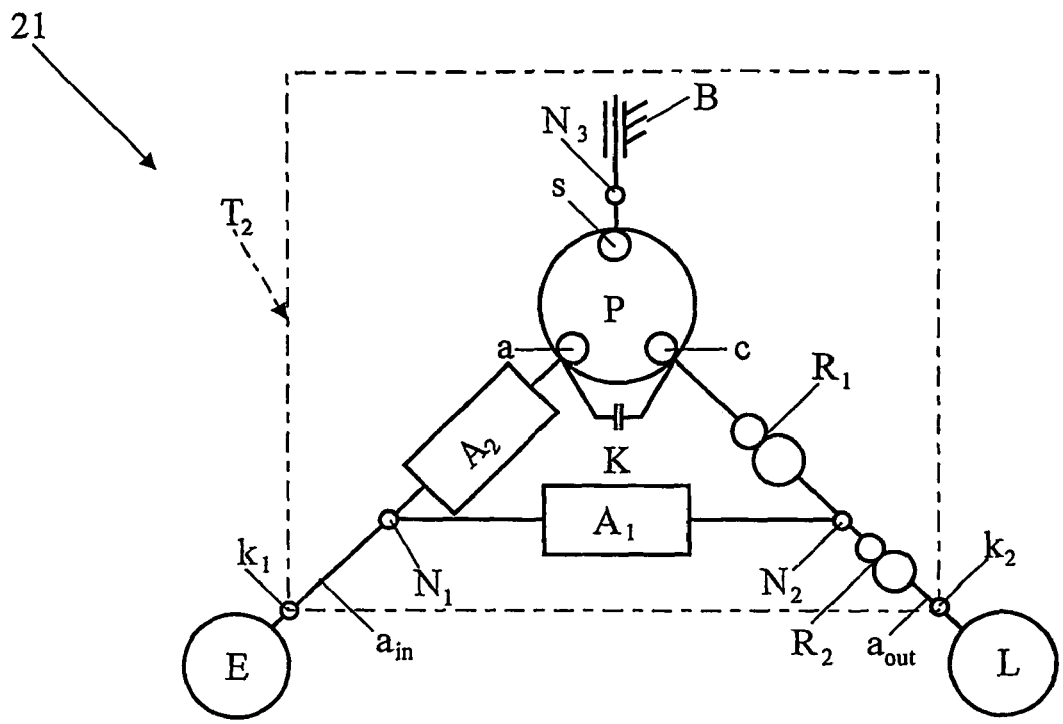
FIG. 3 depicts a diagram of a vehicle equipped with a second configuration of the transmission system according to the invention, where one transmission is parallel to and one transmission is in series with the epicyclic gearing.

FIG. 3 schematically depicts a vehicle 21 equipped with a second configuration of the transmission system according to the invention. All components which are identical to those of the first configuration are referred to by the same symbols. This transmission system $T_2$ does not have a synchromesh between the transmission $A_1$ and the input shaft $a_{in}$ but a lock-up clutch instead, which can connect the first rotational member a to the second rotational member c. This can be used to lock the epicyclic gearing. Besides, a further transmission $A_2$ is located between the first rotational member and the first node $N_1$.

With this transmission system $T_2$, gear shifts can be performed without torque interruption using only one brake. This will be explained in the following. Here the transmission $A_1$ comprises the gear stages corresponding to $1^{st}$, $3^{rd}$ and $5^{th}$ gear, and transmission $A_2$ comprises the gear stages corresponding to $0_{th}$, $2_{nd}$ and $4^{th}$ gear (the transmission ratio in $0^{th}$ gear is lower than that in $1^{st}$ gear, though larger than 0).

The transmission $A_2$ can be directly connected to the load L via the lock-up clutch K. Besides, the transmission $A_2$ can be connected to the load L by means of the 'braked' planetary set P. This yields the transmission ratios of the $1^{st}$, $3_{rd}$ and $6_{th}$ gear, between the load L and the combustion engine E. The $0^{th}$ gear is needed to obtain the $1^{st}$ gear via the planetary set P.

By activating the brake B, launching the vehicle in $1^{st}$ gear is possible via the planetary set P ($A_2$ is in $0^{th}$ gear). By closing the brake B, $1^{st}$ gear is obtained. The transmission $A_1$ can now take over $1^{st}$ gear synchronously (brake B is released). The transmission $A_2$ no longer transmits torque and $2^{nd}$ gear can be selected. By activating brake B transmission $A_1$ can be unloaded (and disengaged) and further upshifting can take place (decelerate engine). When the lock-up, clutch K is synchronous it can be engaged. The 2gear via transmission $A_2$ is now engaged.

By activating the brake B, the lock-up clutch K can now be unloaded (and disengaged) and further upshifting can take place (decelerate engine). The brake B can now be closed yielding $3^{rd}$ gear. The transmission $A_1$ can now take over $3^{rd}$ gear synchronously (brake B is released). The transmission $A_2$ does no longer transmit torque and $4^{th}$ gear can be selected. By activating brake B transmission $A_2$ can be unloaded (and disengaged) and further upshifting can take place (decelerate engine). When the lock-up clutch K is synchronous it can be engaged. The $4^{th}$ gear via transmission $A_2$ is now engaged.

By activating the brake B, the lock-up clutch K can now be unloaded (and disengaged) and further upshifting can take place (decelerate engine), When the $5_{th}$ gear in transmission $A_1$, is synchronous it can be engaged (brake B is released).

By activating the brake B, transmission $A_1$, can now be unloaded (and disengaged) and further upshifting can take place (decelerate engine), The brake B can now be closed yielding $6^{th}$.

The brake B should have an inertia, as small as possible so that its inertia load during closing is minimal. When the brake B is closed the planetary reduction between the first and the second rotational member r and c should be approximately 1.5. The braked ratio is larger than the locked ratio.

From the braked ratio, preferably a synchronous shift is performed to an equally large parallel transmission ratio. After that, the future braked ratio can be changed by shifting transmission $A_2$. If the brake B is now activated, the planetary set P can be locked where the new ratio of transmission $A_2$ is engaged. By again activating the brake B, the shift towards the higher braked ratio can be performed.

Figure 4:
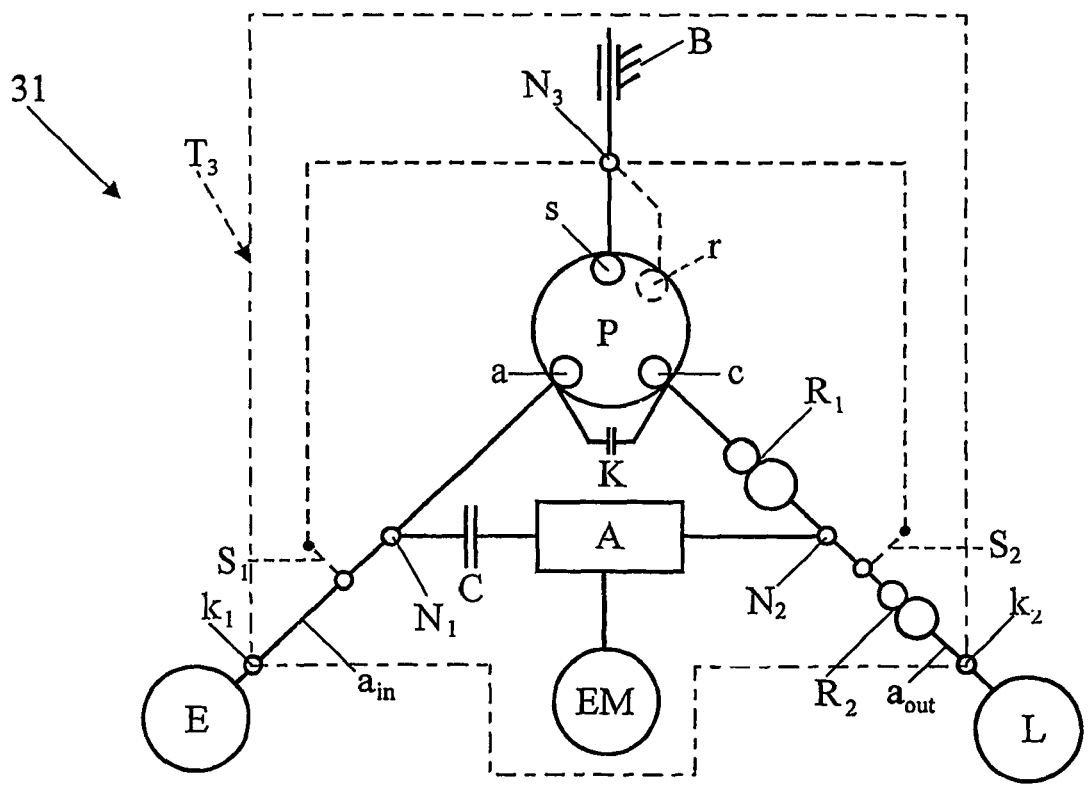
FIG. 4 depicts a diagram of a vehicle equipped with a third configuration of the transmission system according to the invention, where the transmission is parallel to the epicyclic gearing and where an electric motor is connected to the transmission and a clutch may or may not be located between the drive source and the transmission.

In FIG. 4, a diagram of a vehicle 31 equipped with a third configuration of the transmission system according to the invention is depicted. All components which are identical to those of the second configuration are referred to by the same symbols. This transmission system $T_3$ has no further transmission $A_2$. This transmission system $T_3$ does have an electric motor EM which is connected to the transmission A. Furthermore, the transmission system $T_3$ comprises a switch-clutch $S_1$ that is located between the input shaft $a_{in}$ on the one hand, and the first and third rotational member a and s, respectively, on the other. Besides, the transmission system $T_3$ may or may not comprise a disengager C for the transmission between the first node $N_1$ and the transmission A.

Figure 5:
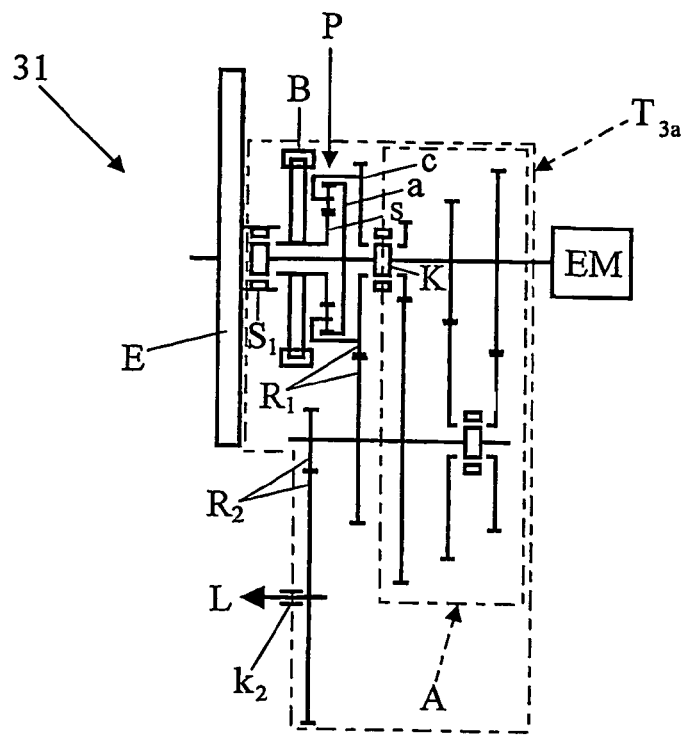
FIG. 5 schematically depicts a constructional configuration of the transmission system, of the vehicle that was depicted in FIG. 4, without a clutch between the drive source and the transmission.
Figure 6:
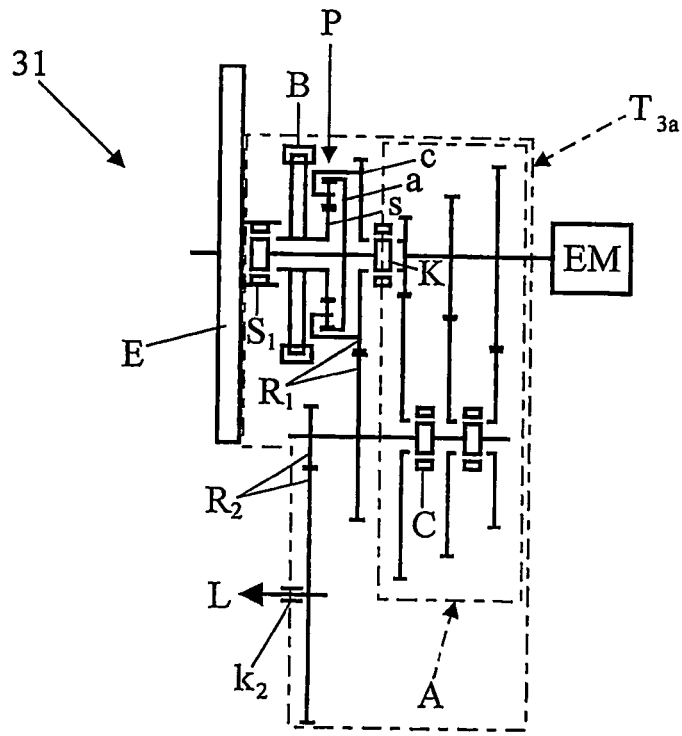
FIG. 6 schematically depicts a constructional configuration of the transmission system, of the vehicle that was depicted in FIG. 4, with a clutch between the drive source and the transmission.

FIG. 5. schematically depicts a constructional configuration of the transmission system $T_{3B}$ of, the vehicle 31 that was depicted in FIG. 4, without a disengager C for the transmission between the drive source and the transmission, whereas FIG. 6 schematically depicts the transmission:system $T_{3b}$ with the disengager C for the transmission between the drive source and the transmission.

Instead of an epicyclic gearing P with three rotational members these transmission systems $T_{3a}$ and $T_{3b}$ can also be equipped with an epicyclic gearing comprising four rotational members, where the brake B can be connected to the third rotational member. s or the fourth rotational member r. This enables more braked transmission ratios.

To enable more transmission ratios, these transmission systems $T_{3a}$ and $T_{3b}$ may comprise a switch-clutch $S_1$ that is located between the drive source E and the first and third rotational member a, s. The switch-clutch $S_2$ can connect the input shaft $a_{in}$ to the first or to the third rotational member, a and s, respectively. The transmission systems $T_{3a}$ and; $T_{3b}$ may additionally comprise a further switch-clutch $S_2$ that is located between the output shaft $a_{out}$ and the second and third rotational members c, s. This further switch-clutch $S_2$ can connect the driven wheels L to the second or third rotational member c and s, respectively.

Next, the transmission systems $T_{3a}$ and $T_{3b}$ may comprise a pair of switch-clutches (not depicted) that can interchange the connections of the first and second rotational members a, c. This enables connecting the drive source E to the second rotational member c and the load L to the first rotational member a. This also enables more transmission ratios.

Further transmission ratios can also be obtained by using one or more gear stages of the transmission(s) in a series connection. This is possible by dividing the input and/or output shaft of the transmission A in FIGS. 1 and 4 or $A_1$, and $A_2$ in FIG. 3, into two or more subshafts which can be disconnected by one or more transmission clutches.

Figure 7:
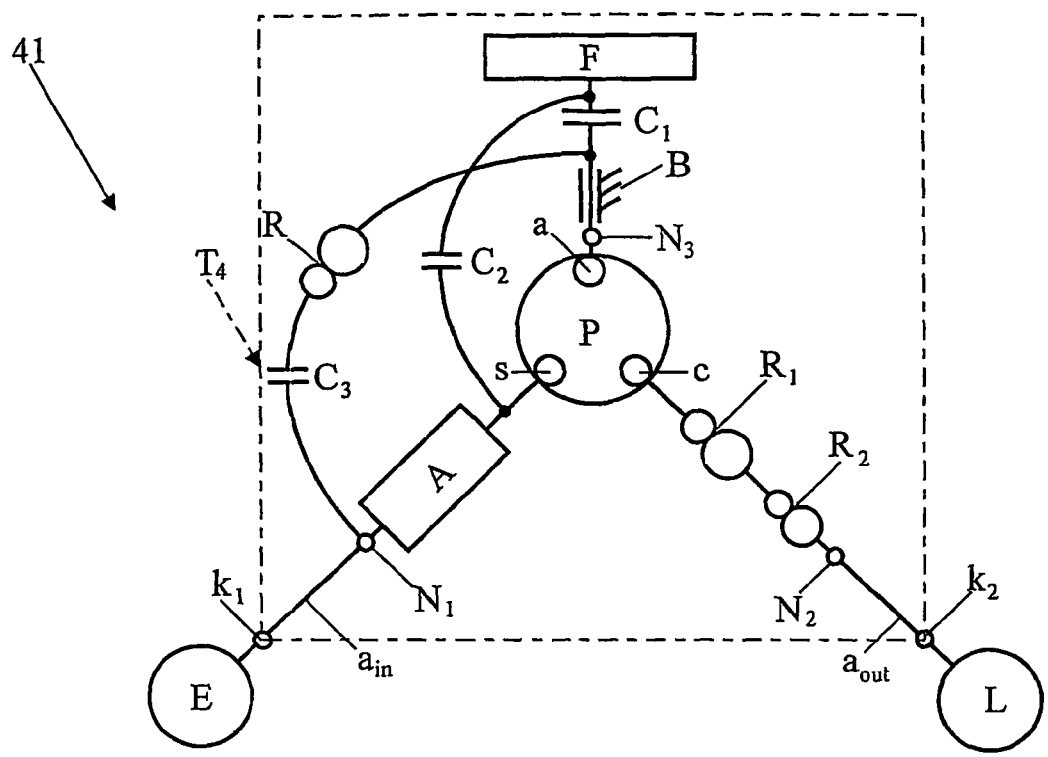
FIG. 7 depicts a diagram of a vehicle equipped with a fourth configuration of the transmission system according to the invention, where the transmission is in series with the epicyclic gearing.

FIG. 7 depicts a diagram of a vehicle 41 equipped with a fourth configuration of the transmission system $T_4$ according to the invention. In this transmission system $T_4$ the transmission A is in series with the epicyclic gearing P. The epicyclic gearing P is constituted by a planetary gear set, where, contrary to the preceding configurations, the first rotational member s is formed by the sun gear and is connected to the transmission A, and the third rotational member a is formed by the ring gear and connected to the brake B. This transmission system $T_4$ furthermore comprises an inertia element formed by a flywheel F for additional torque support. To this end, the flywheel F can be connected to the third rotational member a via an inertia-clutch $C_1$, or to the first rotational member s, via a further inertia-clutch $C_2$.

To enable driving in reverse using this transmission system $T_4$, without the need for a dedicated gear stage in the transmission A, the third rotational member a can be connected to the drive source E via a reduction R and a reduction-clutch $C_3$. Here, the brake B may be located between the reduction R and the reduction-clutch $C_3$ instead of being directly connected to the third rotational member a, thus decreasing the load on the brake B.

Figure 8:
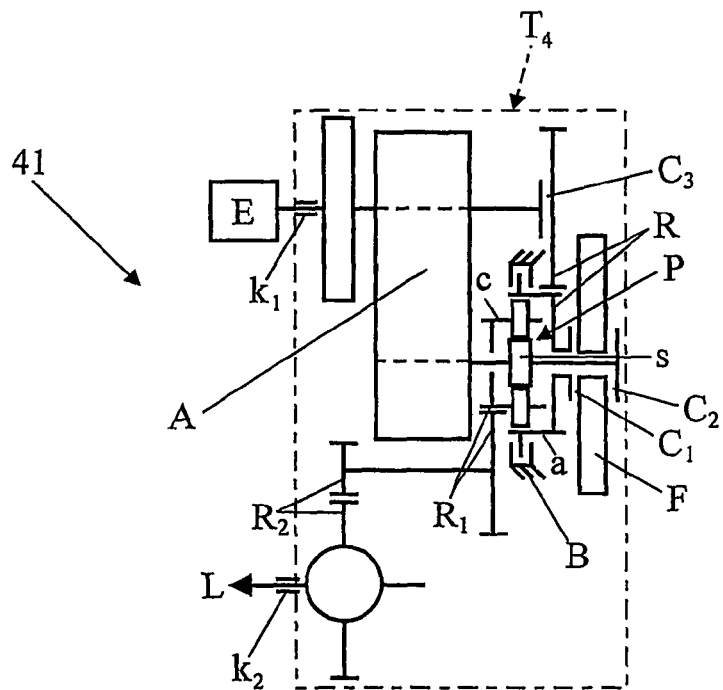
FIG. 8 schematically depicts a constructional configuration of the transmission system, of the vehicle that was depicted in FIG. 7.

FIG. 8 schematically depicts a constructional configuration of the transmission system $T_4$, of the vehicle 41 that Was depicted in FIG. 7.

Figure 9:
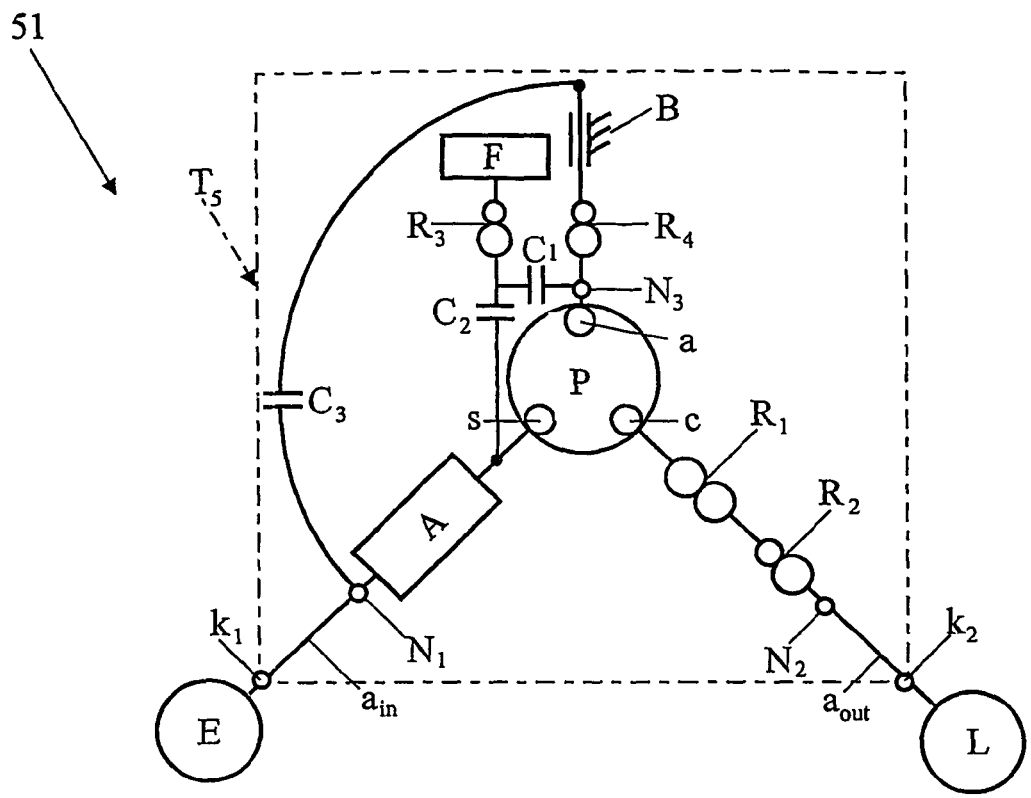
FIG. 9 depicts a diagram of a vehicle equipped with a fifth configuration of the transmission system according to the invention, where two additional reductions are present.

FIG. 9 depicts a diagram of a vehicle 51 equipped with a fifth configuration of the transmission system $T_5$ according to the invention. In this case, there is no reduction R, but instead two additional reductions $R_3$ and $R_4$ are present, between the flywheel F and the clutch $C_1$, and between the brake B and the third rotational member a, respectively. Furthermore, the clutch $C_1$, is not located between the flywheel F and the brake B, but between the third rotational member a on the one hand, and the reduction $R_3$ and the clutch $C_2$, on the other.

Figure 10:
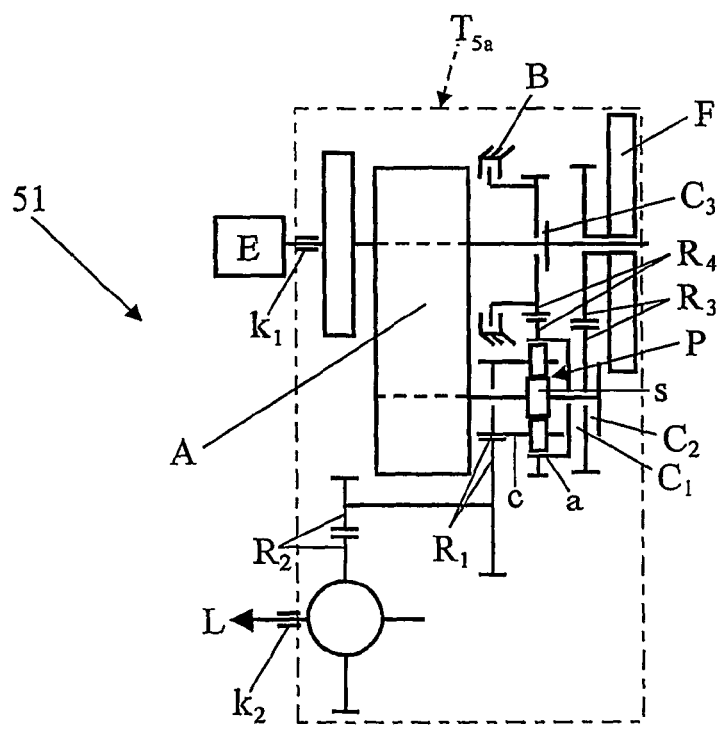
FIG. 10 schematically depicts a constructional configuration of the transmission system, of the vehicle that was depicted in FIG. 9.
Figure 11:
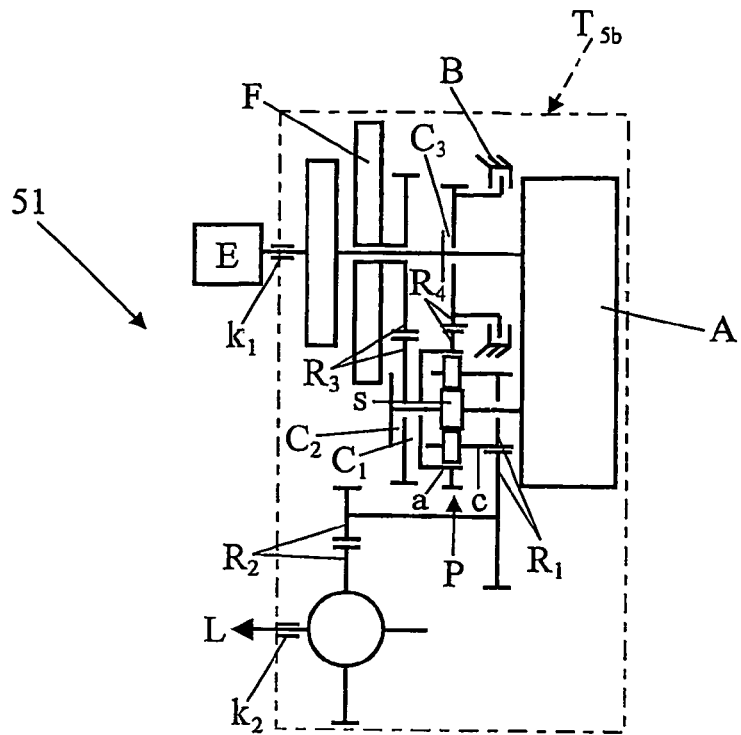
FIG. 11 schematically depicts another constructional configuration of the transmission system, of the vehicle that was depicted in FIG. 9.

FIGS. 10 and 11 schematically depict two different constructional configurations of the transmission system $T_5$, of the vehicle 51 that was depicted in FIG. 9. In the configuration $T_{5b}$ depicted in FIG. 11, the part of the transmission system that is located between the drive source E and the reduction $R_1$ is mirrored with respect to the configuration $T_{5a}$ depicted in FIG. 10.

Figure 12:
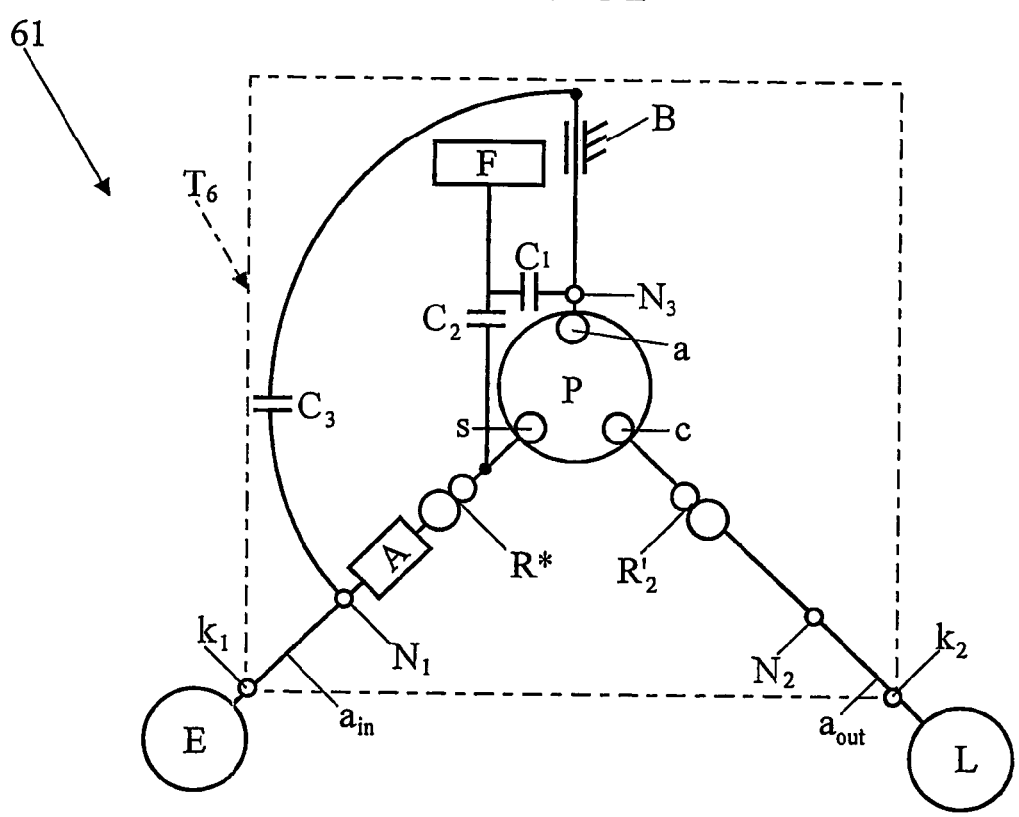
FIG. 12 depicts a diagram of a vehicle equipped with a sixth configuration of the transmission system according to the invention, with only one reduction.

FIG. 12 depicts a diagram of a vehicle 61 equipped with a sixth configuration of the transmission system $T_6$ according to the invention. This configuration $T_6$ is a simplification of the fifth configuration $T_5$. Here, the three reductions $R_1$, $R_3$, and $R_4$ are replaced by one new reduction R* where the transmission ratio of the reduction $R_2$' is modified.

Figure 13:
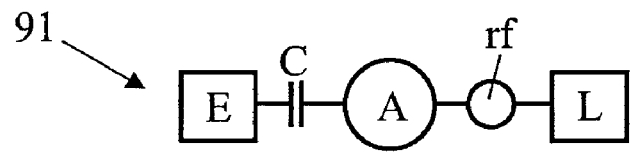
FIG. 13 schematically depicts a conventional transmission system.
Figure 14:
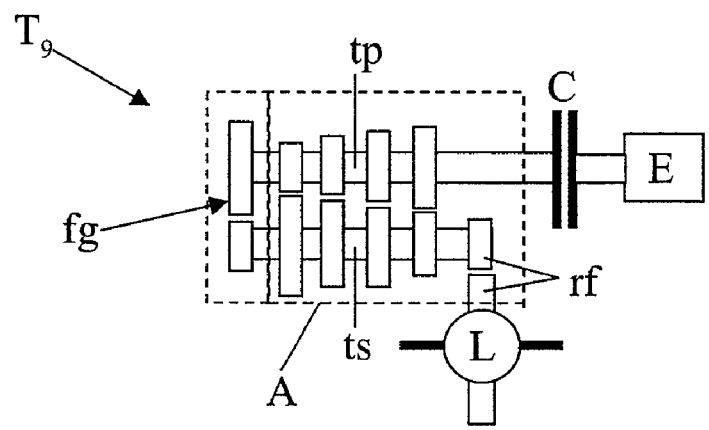
FIG. 14 depicts a constructional configuration of the conventional transmission system that was depicted in FIG. 13.
Figure 15:
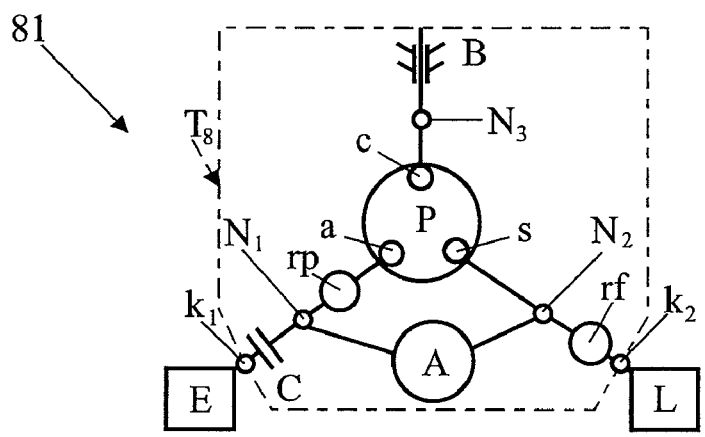
FIG. 15 schematically depicts a vehicle equipped with a seventh configuration of the transmission system according to the invention.
Figure 16:
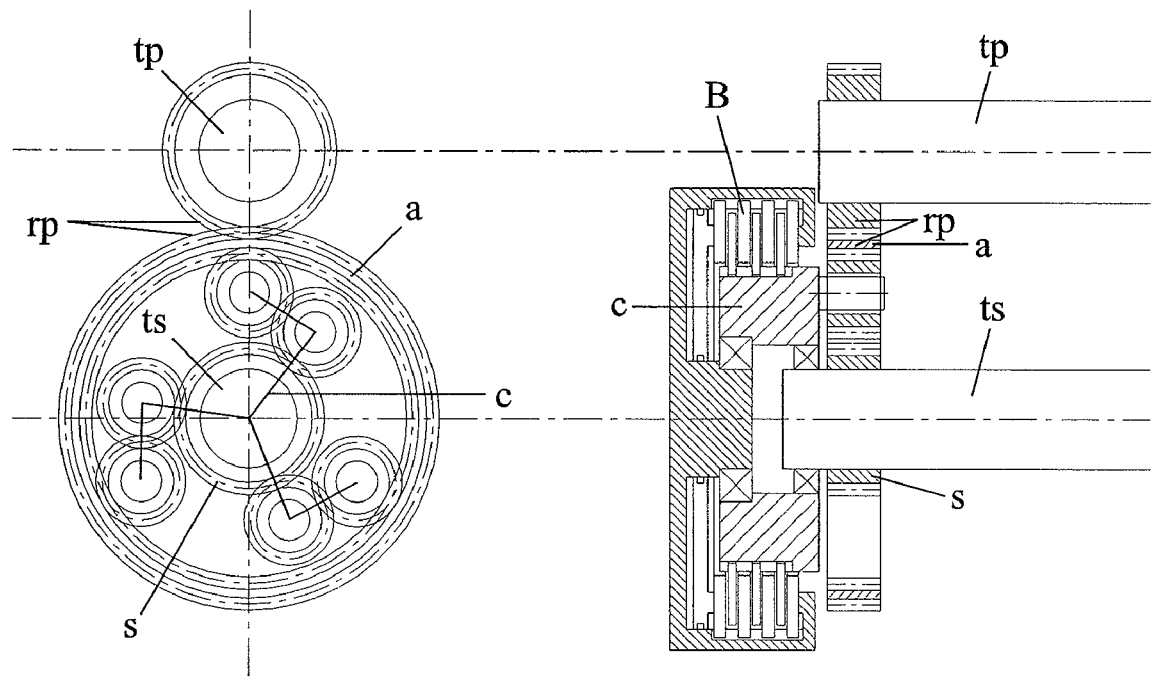
FIG. 16 depicts a detail of a constructional configuration of the transmission system, of the vehicle that was depicted in FIG. 15.

FIGS. 15 and 16 depict a vehicle 81 equipped with a seventh configuration $T_8$ of the transmission system according to the invention, in a schematic fashion and as a detail of a concrete form, respectively. This eighth configuration is highly suited for application in an existing transmission system. FIGS. 13 and 14 depict a vehicle 91 equipped with an existing transmission system $T_9$, in a schematic and concrete form, respectively. The most common existing transmission system $T_9$ for a car comprises a drive source E that is connected to the primary shaft tp of a transmission A via a clutch C. The secondary shaft ts of the transmission A is connected to a load L via a gear reduction rf, where the load L is constituted by a differential with driven wheels connected to that.

In this existing transmission system, the fifth gear stage fg, see FIG. 15, of the transmission A, can be easily replaced by an epicyclic gearing P with brake B and reduction rp, as is depicted in detail in FIG. 17 in side view and cross sectional view. The epicyclic gearing P is formed by a planetary gear set comprising a sun gear s, a planet carrier c and a ring gear a. The sun gears is connected to the secondary shaft ts of the transmission A and the brake B is connected to the planet carrier c. The planet carrier c has double planets. The ring gear a has toothing at its outer circumference, which forms the reduction rp in combination with a gear wheel that is connected to the primary shaft tp of the transmission A.

Although above the invention has been elucidated using the drawings, it should be stated that the invention is in no way limited to the embodiments depicted in these drawings. The invention also extends to all embodiments that deviate from those depicted in the drawings, within the context defined by the appending claims. For instance, the input shaft $a'''$ of the transmission T can also be directly connected to the drive source E, instead of via the shaft connection $k_1$. Also, a reduction can be located between the brake and the epicyclic gearing in order to reduce the load on the brake. Furthermore, in the depicted embodiments the brake may be replaced by or augmented with a one-way clutch and/or an electric motor/generator and/or a further load and/or a storage of potential energy. Also, in the first configuration the brake can be replaced by an inertia element, such as a flywheel, in which case also an electric motor is connected to the transmission.

The invention claimed is:

1. A transmission system for a vehicle, comprising:
    an input shaft connectable to a drive source;
    an output shaft connectable to wheels of the vehicle;
    a transmission that comprises at least one of a synchromesh and a dog clutch necessary for changing the transmission ratio, said transmission having an input and output shaft, the transmission ratio of which can have at least two values, wherein the input shaft of the transmission is connected to the input shaft of the transmission system via a first node and the output shaft of the transmission is connected to the output shaft of the transmission system via a second node;
    a reaction means comprising a brake, wherein a portion of the brake is connected to a fixed housing and wherein the brake can be appropriately activated such that more or less torque can be balanced;
    an epicyclic gearing having at least three rotational members, of which a first rotational member is connected to the first node, a second rotational member is connected to the second node so that the epicyclic gearing is parallel with the transmission, and a third rotational member is connectable to the reaction means via a third node; and
    wherein the brake is a friction brake which can dissipate enough power to halt the third rotational member.

2. The transmission system according to claim 1, characterized in that the reaction means comprise an inertia element.

3. The transmission system according to claim 1, characterized in that the transmission system comprises an electric motor that is connectable to one of the nodes, the reaction means, the input or output shaft of the transmission system, one of the rotational members, or the transmission.

4. The transmission system according to claim 1, characterized in that the transmission system furthermore comprises a launch clutch, that can connect and disconnect the input and output shafts of the transmission system.

5. The transmission system according to claim 1, characterized in that the transmission system comprises a lock-up clutch, that is located between two of the three rotational members.

6. The transmission system according to claim 5, characterized in that the lock-up clutch is constituted by a launch clutch.

7. The transmission system according to claim 5, characterized in that the transmission system comprises a disengager for the transmission that is located in the transmission system such that it can disengage the transmission from the input shaft of the transmission system.

8. The transmission system according to claim 4, characterized in that the disengager is constituted by a launch clutch or a synchromesh.

9. The transmission system according to claim 7, characterized in that the disengager can connect the transmission to the node connected to the input shaft of the transmission, or it can connect this node to the other node that is connected to the transmission, or it can connect this node to neither.

10. The transmission system according to claim 1, characterized in that the transmission system comprises at least one switch-clutch that is located between the reaction means or the input or output shaft of the transmission, on the one hand, and the first, second or third rotational member connected to it and one of the other two rotational members, on the other hand, where the switch-clutch can connect either the reaction means or the input or output shaft of the transmission system to one of the two said rotational members.

11. The transmission system according to claim 1, characterized in that the transmission system comprises at least one pair of switch-clutches, where each switch-clutch is located between one of the first, second or third rotational members on the one hand, and two elements from the group of elements consisting of the reaction means and the input and output shaft of the transmission system, on the other hand, where each switch-clutch can connect the first, second or third rotational member to either one of the elements from the group of elements.

12. The transmission system according to claim 1, characterized in that the epicyclic gearing comprises a fourth rotational member that is connectable to one of: the brake, the reaction means, the input or output shaft of the transmission system, a further brake, one of the other rotational members, and one of the nodes.

13. The transmission system according to claim 2 characterized in that the transmission system comprises a disengager for the inertia element, which is present between the inertia element and the third rotational member.

14. The transmission system according to claim 13, characterized in that the transmission system also has a further disengager for the inertia element, that is located between the inertia element and the first rotational member.

15. The transmission system according to claim 1, characterized in that the transmission system comprises at least one torsional spring, which is located between a node on the one hand, and the reaction means or the input or output shaft of the transmission system, or the transmission or the epicyclic gearing on the other.

16. The transmission system according to claim 1, characterized in that the transmission comprises at least one reduction, which is located between a node on the one hand, and the reaction means or the input or output shaft of the transmission system or the transmission or the epicyclic gearing on the other, or between the transmission on the one hand, and the reaction means or the input or output shaft of the transmission system or the epicyclic gearing on the other, or between the reaction means and the input or output shaft of the transmission system.

17. The transmission system according to claim 16, characterized in that the transmission system furthermore comprises at least one disengager for the reduction, which is located between the reduction and one of the parts o the transmission system connected to the reduction.

18. The transmission system according to claim 4, characterized in that the transmission system comprises at least one further clutch that is located between two parts of the transmission system.

19. The transmission system according to claim 1, characterized in that at least one of the input and output shaft of the transmission is dividec into two or more subshafts, which can be interconnected via one or more transmission clutches.

20. The transmission system according to claim 1, characterized in that the transmission is parallel to the epicyclic gearing and a clutch is furthermore located between the transmission and the input shaft of the transmission system, and where the epicyclic gearing and the reaction means are part of an auxiliary transmission system which is part of the transmission system.

* * * * *